US012466202B2

(12) United States Patent
Brown et al.

(10) Patent No.: US 12,466,202 B2
(45) Date of Patent: Nov. 11, 2025

(54) VARIABLE LENGTH CUTTING SYSTEMS AND METHODS

(71) Applicant: Avery Dennison Retail Information Services LLC, Mentor, OH (US)

(72) Inventors: Timothy L. Brown, Dayton, OH (US); Jan M. Watson, Miamisburg, OH (US); John D. Mistyurik, Troy, OH (US); Marc A. Herwald, Springboro, OH (US); Jesus Romo, Jr., Fairborn, OH (US)

( * ) Notice: Subject to any disclaimer, the term of this patent is extended or adjusted under 35 U.S.C. 154(b) by 0 days.

(21) Appl. No.: 18/548,617

(22) PCT Filed: Mar. 3, 2022

(86) PCT No.: PCT/IB2022/051900

§ 371 (c)(1),
(2) Date: Sep. 1, 2023

(87) PCT Pub. No.: WO2022/185257

PCT Pub. Date: Sep. 9, 2022

(65) Prior Publication Data

US 2024/0157716 A1 May 16, 2024

Related U.S. Application Data

(60) Provisional application No. 63/157,136, filed on Mar. 5, 2021.

(51) Int. Cl.

*B41J 11/70* (2006.01)
*B26D 1/18* (2006.01)
*B41J 11/66* (2006.01)

(52) U.S. Cl.

CPC ............ *B41J 11/703* (2013.01); *B26D 1/185* (2013.01); *B41J 11/663* (2013.01)

(58) Field of Classification Search

CPC ........ B41J 11/703; B41J 11/663; B26D 1/185
See application file for complete search history.

(56) References Cited

U.S. PATENT DOCUMENTS 4,861,541 A * 8/1989 Kaminski ........... B29C 49/2408 264/516
5,032,344 A * 7/1991 Kaminski ............ B65C 9/1826 264/509
6,253,652 B1 * 7/2001 Dax ..................... B26D 7/2621 83/563
2006/0115313 A1 * 6/2006 Shaw, III ................ B41J 15/04 400/621
2007/0144373 A1 * 6/2007 Okura .................. B65H 23/046 101/226
2018/0312289 A1 11/2018 Gomes da Costa et al.
2019/0121583 A1 * 4/2019 Van Vliembergen ........................ G06F 3/1207
2020/0087015 A1 * 3/2020 Stern ...................... B41J 11/703

OTHER PUBLICATIONS

International Search Report and Written Opinion dated Jun. 8, 2022 issued in IA No. PCT/IB2022/051900 filed Mar. 3, 2022.

* cited by examiner

*Primary Examiner* — David H Banh

(57) ABSTRACT

In some embodiments, a modular system for a printer may include a support bracket configured to be coupled to a printer, a cutting unit laterally mounted to the support bracket, and a tamp system laterally mounted to the support bracket. The cutting unit may be configured to receive a label web from the printer.

22 Claims, 11 Drawing Sheets

VARIABLE LENGTH CUTTING SYSTEMS AND METHODS

CROSS-REFERENCE TO RELATED APPLICATIONS

This application is a 371 of International Application No. PCT/IB2022/051900, which was published in English on Sep. 9, 2022, and claims the benefit of U.S. Provisional Patent Application No. 63/157,136 filed on Mar. 5, 2021, both of which are incorporated herein by reference in their entireties.

BACKGROUND

The present subject matter relates to printing and/or cutting materials. More particularly, the present subject matter relates to variable length cutting systems and methods.

In some existing modular cutting systems, certain capabilities for handling material and/or integrating with existing printers may be lacking. As a result, some modular cutting systems may be incompatible with or ineffective for use with some printing systems. As a result, such printers may not be able to gain the benefit of use of particular modular cutting systems. Accordingly, improvements may be made in existing systems.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In some embodiments, a modular system for a printer may include a support bracket configured to be coupled to a printer, a cutting unit laterally mounted to the support bracket, and a tamp system laterally mounted to the support bracket. The cutting unit may be configured to receive a label web from the printer.

In some embodiments, the cutting unit may be configured to cut the label web based on signals received from the printer. The cutting unit further may include a motor and a first lateral wall. The cutting unit further may include a second lateral wall, a first support, and a second support. The first support and the second support may each extend between and may be mounted to the first lateral wall and the second lateral wall. In various embodiments, the motor may be mounted to one or both of the first lateral wall and the second lateral wall between the first support and the second support.

In some embodiments, the cutting unit further may include a first web guide and a second web guide. The cutting unit may include a moveable cutter assembly. The support bracket may define a cavity configured to receive a first wheel, a belt, and a second wheel of the cutter unit. The cutting unit may include a first wheel and a second wheel that may be vertically aligned.

In some embodiments, a method of forming a modular system for a printer may include forming a support bracket configured to be coupled to a printer, laterally mounting a cutting unit to the support bracket, and laterally mounting a tamp system to the support bracket. The cutting unit may be configured to receive a label web from the printer.

In some embodiments, the cutting unit may be configured to cut the label web based on signals received from the printer. The method may include mounting a motor to a first lateral wall of the cutting unit. The method may include forming the cutting unit by assembling a second lateral wall, a first support, and a second support such that the first support and the second support each extend between and may be mounted to the first lateral wall and the second lateral wall. The motor may be mounted to the first lateral wall between the first support and the second support.

In some embodiments, the cutting unit further may include a first web guide and a second web guide. The cutting unit may include a moveable cutter assembly. The support bracket may define a cavity configured to receive a first wheel, a belt, and a second wheel of the cutter unit. The cutting unit may include a first wheel and a second wheel that may be vertically aligned.

DESCRIPTION OF THE ILLUSTRATED EMBODIMENTS

As required, detailed embodiments of the present subject matter are disclosed herein; however, it is to be understood that the disclosed embodiments are merely exemplary of the present subject matter, which may be embodied in various forms. Therefore, specific details disclosed herein are not to be interpreted as limiting, but merely as a basis for the claims and as a representative basis for teaching one skilled in the art to variously employ the present subject matter in virtually any appropriate manner.

Figure 1:
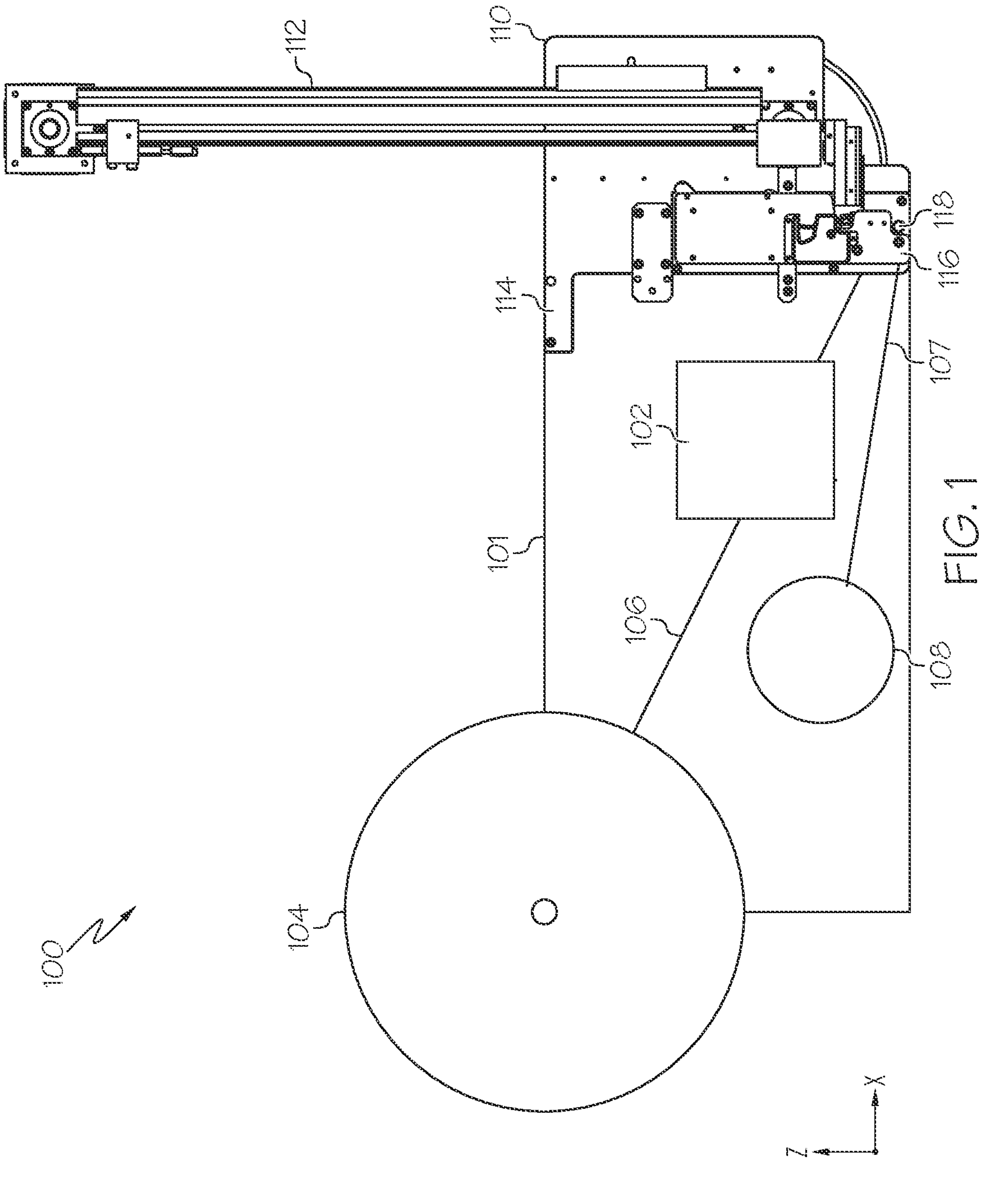
FIG. 1 is a side view of a variable length cutting system in accordance with some embodiments.

FIG. 1 is a side view of a variable length cutting system 100 in accordance with some embodiments. Various embodiments may include one or more of a printer system 101, a printer 102, a feeder spool 104, a label web 106, a liner web 107, a return spool 108, an application system 110, a tamp system 112, a support bracket 114, a cutting unit 116, and/or an air assist unit 118.

In some embodiments, a printer system 101 may lack one or both of a cutting mechanism or a tamp mechanism. The printer system 101 may be mounted with and/or coupled to an application system 110, which may include one or more of the cutting unit 116, the tamp system 112, and the support bracket 114.

The printer system 101, illustrated as a block diagram in FIG. 1, may include a feeder spool 104 mounted with a label web 106 that may or may not be subdivided into separate labels. As the label web 106 is drawn from the feeder spool 104, it may be printed on by a printer 102, such as with label information including one or more of text, graphics, symbols, 1D or 2D barcodes, or other imagery. In some embodiments, the label web includes RFID tags.

In some embodiments, after printing, the label web 106 is drawn into the cutting unit 116 for cutting. In various embodiments, the cutting may be performed as a kiss cut that passes through part or all of the label material but does not penetrate or does not fully penetrate a liner material (e.g., liner web 107) supporting the label material.

In some embodiments, after cutting, cut label material is separated from a liner web 107 and picked up by the tamp system 112, which then delivers the cut label material to a target object for labeling. The liner web 107 may be pulled onto a return spool 108.

In some embodiments, an air assist unit 118 is attached to the support bracket 114. The air assist unit 118 may be a tube extending along a Y-axis, which may be perpendicular to a plane defined by the X-axis and the Z-axis. The air assist unit 118 may include one or more holes formed in an outer surface to direct air towards the tamp system 112. The one or more holes may be formed to direct air at an angle upwards and/or laterally to cause a label to be biased towards part of the tamp system 112, such as toward the bottom of the tamp head 306. Additional details regarding features and operations found in some embodiments are provided below.

Figure 2:
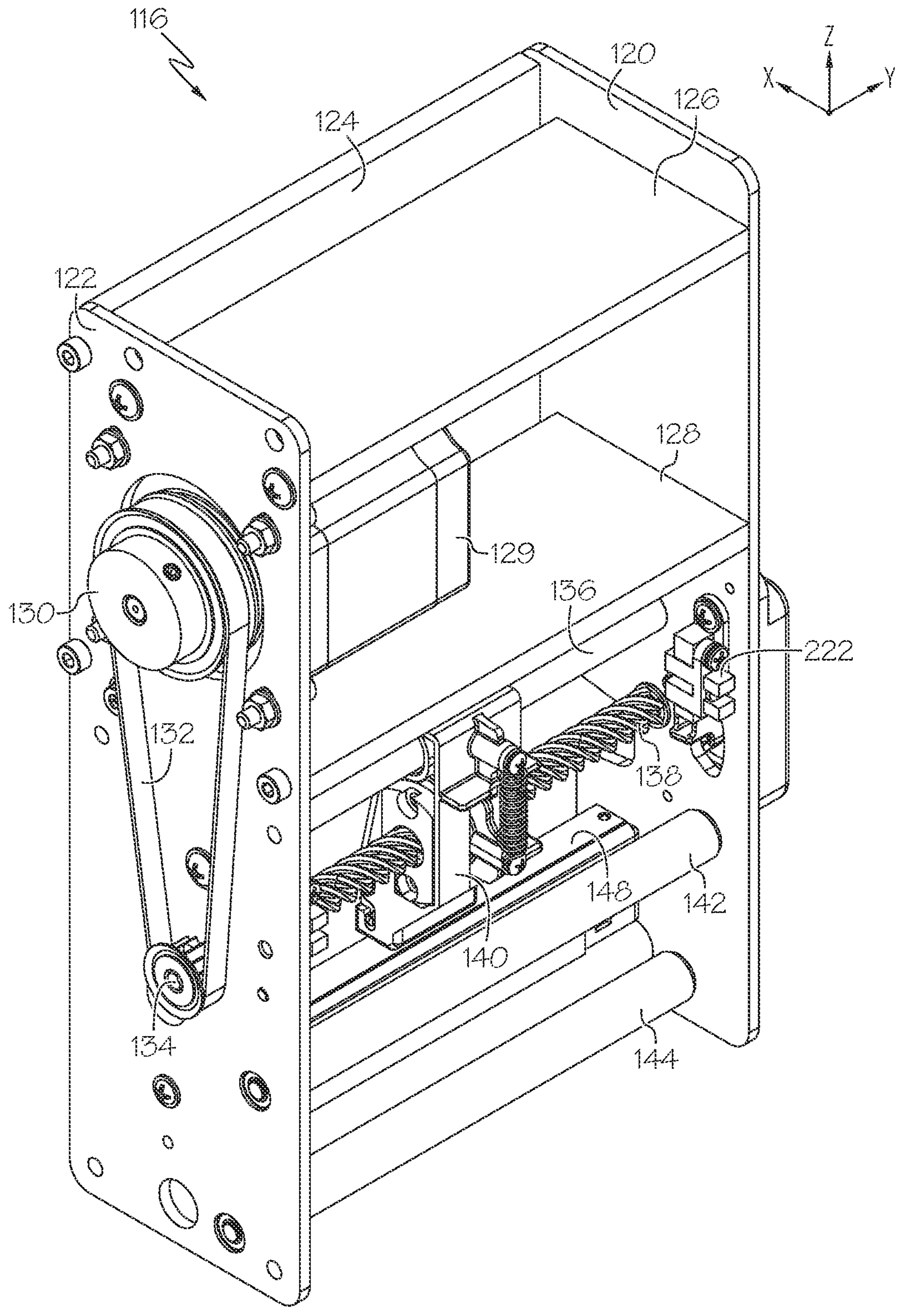
FIG. 2 is a perspective view of a cutting unit in accordance with some embodiments.

FIG. 2 is a perspective view of a cutting unit 116 in accordance with some embodiments. In various embodiments, the cutting unit 116 includes one or more of a first lateral wall 120, a second lateral wall 122, a vertical support 124, a first support 126, a second support 128, a first wheel 130, a belt 132, a second wheel 134, a cutter guide 136, a screw shaft 138, a cutter assembly 140, a first web guide 142, a second web guide 144, and an anvil 148.

In some embodiments, one or both of the first lateral wall 120 and the second lateral wall 122 extend along the X-axis and Z-axis in a plane defined by a Y-axis. One or more of the vertical support 124, the first support 126, the second support 128, the first web guide 142, the second web guide 144, and the anvil 148 extend along the Y-axis between the first lateral wall 120 and the second lateral wall 122. The vertical support 124, the first support 126, and/or the second support 128 may each be formed as a panel, a board, a strut, a rod, a mesh, or other structures, and may define a frame with the first lateral wall 120 and/or the second lateral wall 122. The vertical support 124 may extend along the Y-axis and the Z-axis in the plane defined by the X-axis. The first support 126 and/or the second support 128 may extend in the Y-axis and X-axis directions and may be disposed in the plane defined by the Z-axis. The first support 126, the second support 128, and/or the vertical support 124 may be disposed between and abutted against the first lateral wall 120 and the second lateral wall 122. The first support 126 and/or the second support 128 may be abutted against the vertical support 124.

In some embodiments, the motor 129 may be mounted to the second lateral wall 122 between the first support 126 and the second support 128, and may extend toward the first lateral wall 120. A drive shaft of the motor 129 may extend through the second lateral wall 122, and the first wheel 130 may be mounted to the drive shaft on the opposite side of the second lateral wall 122 from the motor 129. The second wheel 134 may be mounted on the same side of the second lateral wall 122 as the first wheel 130, and the first wheel 130 and the second wheel 134 may be connected by the belt 132. The first wheel 130 and the second wheel 134 may be vertically aligned such that the projection of the second wheel 134 upward along the Z-axis may overlap in part or entirely with the first wheel 130. The vertical alignment of the first wheel 130 and the second wheel 132 may help reduce the width of the cutting unit along the X-axis. In addition, mounting the motor between the first support 126 and the second support 128 may provide additional stability and rigidity for a cutting unit 116 with a reduced footprint in the XY-plane and/or the XZ-plane.

In some embodiments, the second wheel 134 is mounted to and drives rotation of the screw shaft 138. The cutter guide 136, the screw shaft 138, the first web guide 142, the second web guide 144, and the anvil 148 may be mounted to and extend between the first lateral wall 120 and the second lateral wall 122. The screw shaft 138, the first web guide 142, and the second web guide 144 may be rotatably mounted to the first lateral wall 120 and the second lateral wall 122. In some embodiments, the first web guide 142 and/or the second web guide 144 are rollers, which may help reduce friction and/or adhesive buildup. In some embodiments, one or more of the first web guide 142, and the second web guide 144, may be fixed in position and configured to allow the label web 106 and/or the liner web 107 to move slidingly across their surface.

In some embodiments, in operation, the first web guide 142 is positioned to receive the label web 106 from the printer 102. The label web 106 then extends beneath the first web guide 142 to the anvil 148 while passing beneath the cutter assembly 140. In some embodiments, after passing over the anvil 148, the label material is separated from the liner web 107. The liner web 107 is then drawn down and underneath the second web guide 144. From the second web guide 144, the liner web 107 is drawn back towards and wound around the return spool 108.

In some embodiments, the cutter assembly 140 may be mounted to the screw shaft 138 and the cutter guide 136. Lateral movement of the cutter assembly 140 may be driven by the screw shaft 138. In various embodiments, as the cutter assembly 140 is driven laterally across the label web 106, a cutting blade 262 of the cutter assembly 140 is driven across the label web 106 cutting partially or entirely through the label web 106 in the Z-axis direction. In some embodiments, the label web 106 includes at least two layers, having a label layer on top of a liner layer. The cutter assembly 140 may be configured to cut all or partially through the label layer in the Z-axis direction and/or all or partially through the liner layer in the Z-axis direction.

Figure 3:
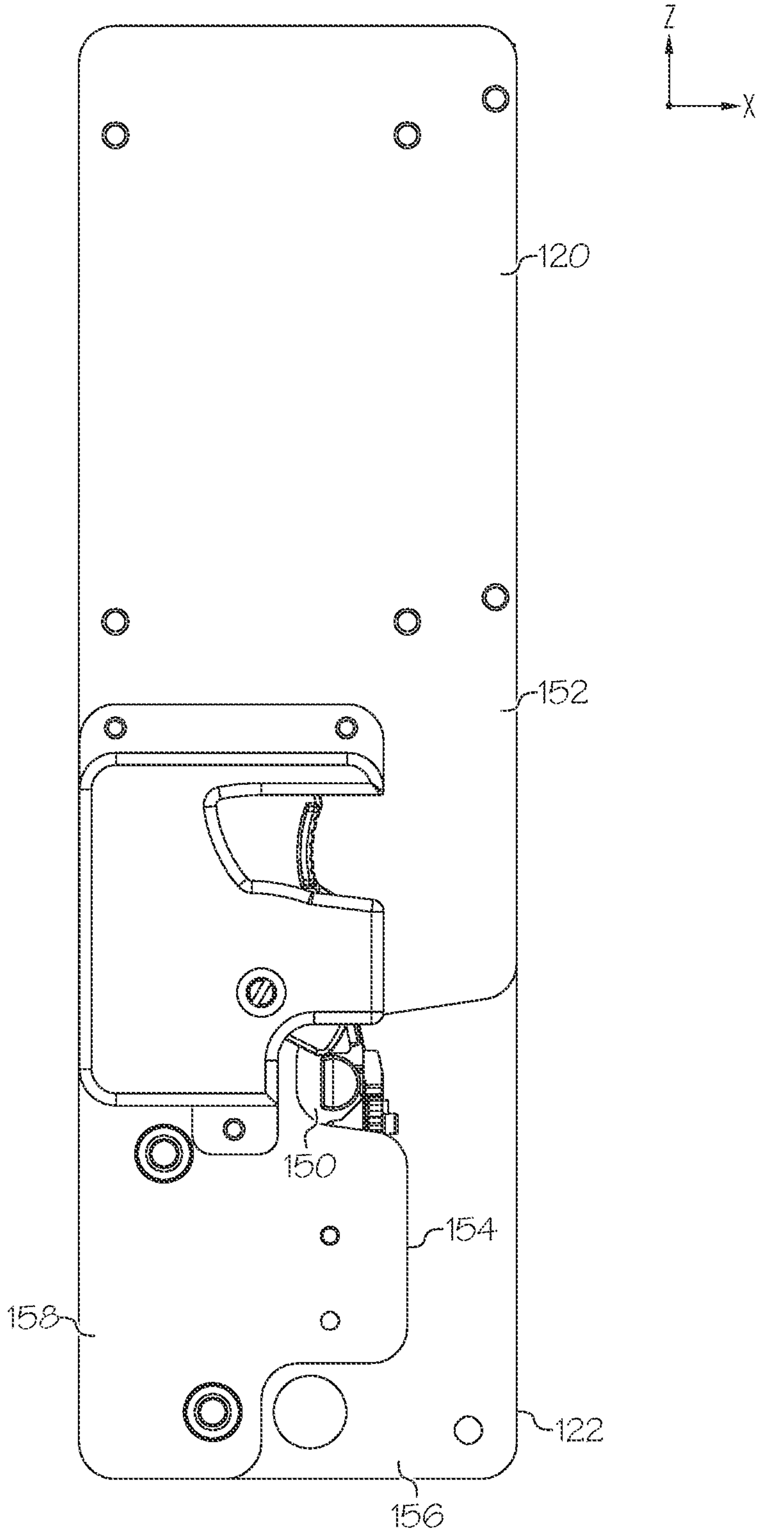
FIG. 3 is a side view of a cutting unit in accordance with some embodiments.

FIG. 3 is a side view of a cutting unit 116 in accordance with some embodiments. FIG. 3 includes the first lateral wall 120, the second lateral wall, a first indentation 150, a first lateral protrusion 152, a second lateral protrusion 154, a second indentation 156, and a first vertical protrusion 158.

In some embodiments, a first lateral protrusion 152 defines the widest segment of the first lateral wall 120 as measured along the X axis. The first lateral protrusion 152 may extend along from the top of the first lateral wall 120 to below the midline of the first lateral wall 120 as measured along the Z-axis. A second lateral protrusion 154 may extend along the X-axis below the first lateral protrusion 152, and may not extend as far along the X-axis as the first lateral protrusion 152. The anvil 148 may be mounted to the second lateral protrusion. The first support 126, the second support 128, the motor 129, the cutter guide 136, and the screw shaft may be mounted to the first lateral protrusion 152.

In some embodiments, a first indentation 150 may be defined between the first lateral protrusion 152 and the second lateral protrusion 154. The first indentation 150 may provide a user with access to the cutter assembly 140 for adjustment or other purposes. In some embodiments, a first vertical protrusion 158 may extend along the Z-axis (e.g., downward or upward) away from the second lateral protrusion 154. The second web guide 144 may be mounted to the first vertical protrusion 158. A second indentation 156 may be defined by a lateral edge of the first vertical protrusion 158 and a horizontally extending edge (e.g., along the X-axis) of the second lateral protrusion 154. The second indentation 156 may provide a user with greater access to the cutter assembly 140 and to install and/or remove the liner web 107.

Figure 4:
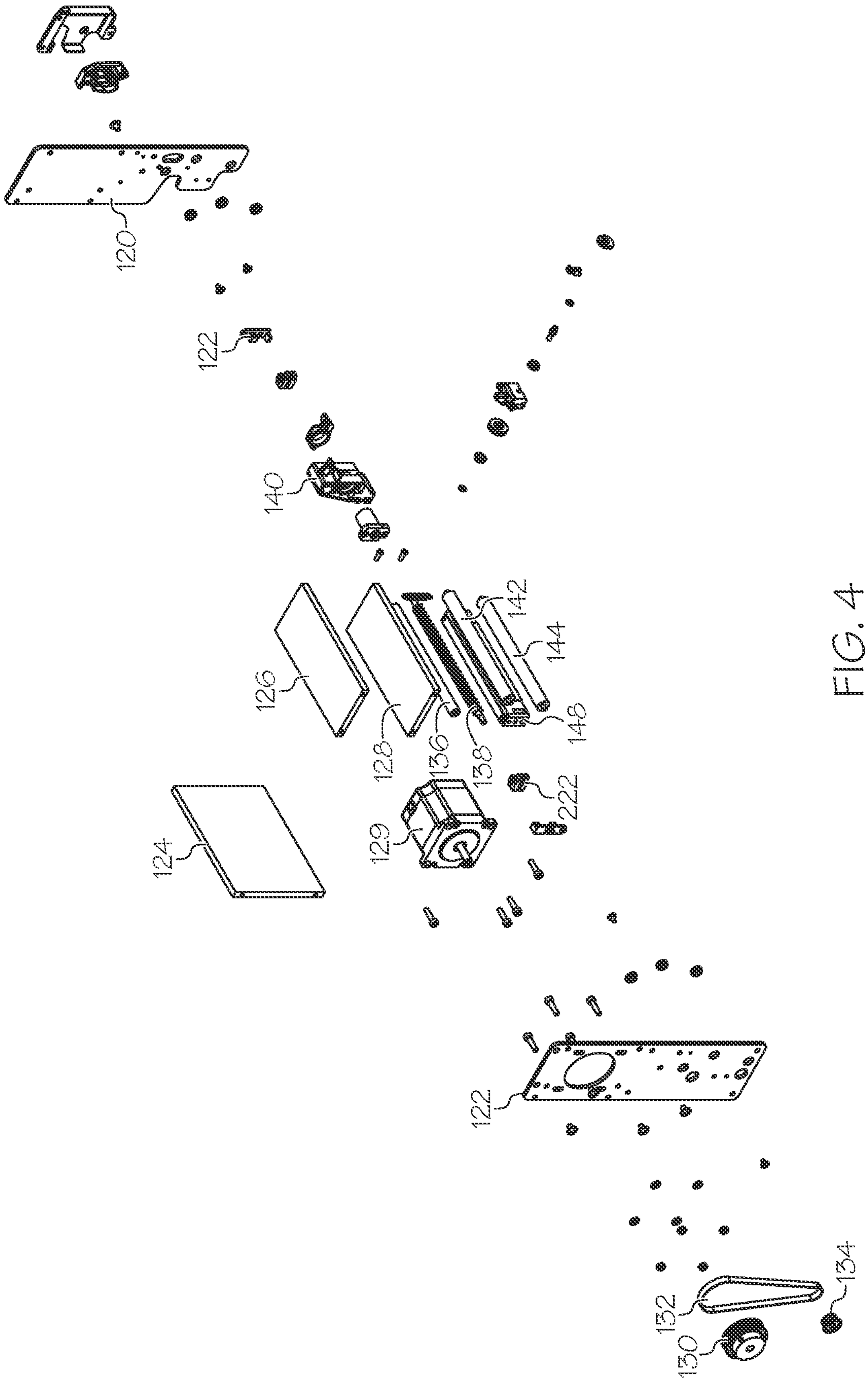
FIG. 4 is an exploded perspective view of a cutting unit in accordance with some embodiments.

FIG. 4 is an exploded perspective view of a cutting unit 116 in accordance with some embodiments. In various embodiments, the cutting unit 116 includes one or more of a first lateral wall 120, a second lateral wall 122, a vertical support 124, a first support 126, a second support 128, a motor 129, a first wheel 130, a belt 132, a second wheel 134, a cutter guide 136, a screw shaft 138, a cutter assembly 140, a first web guide 142, a second web guide 144, and an anvil 148.

Figure 5:
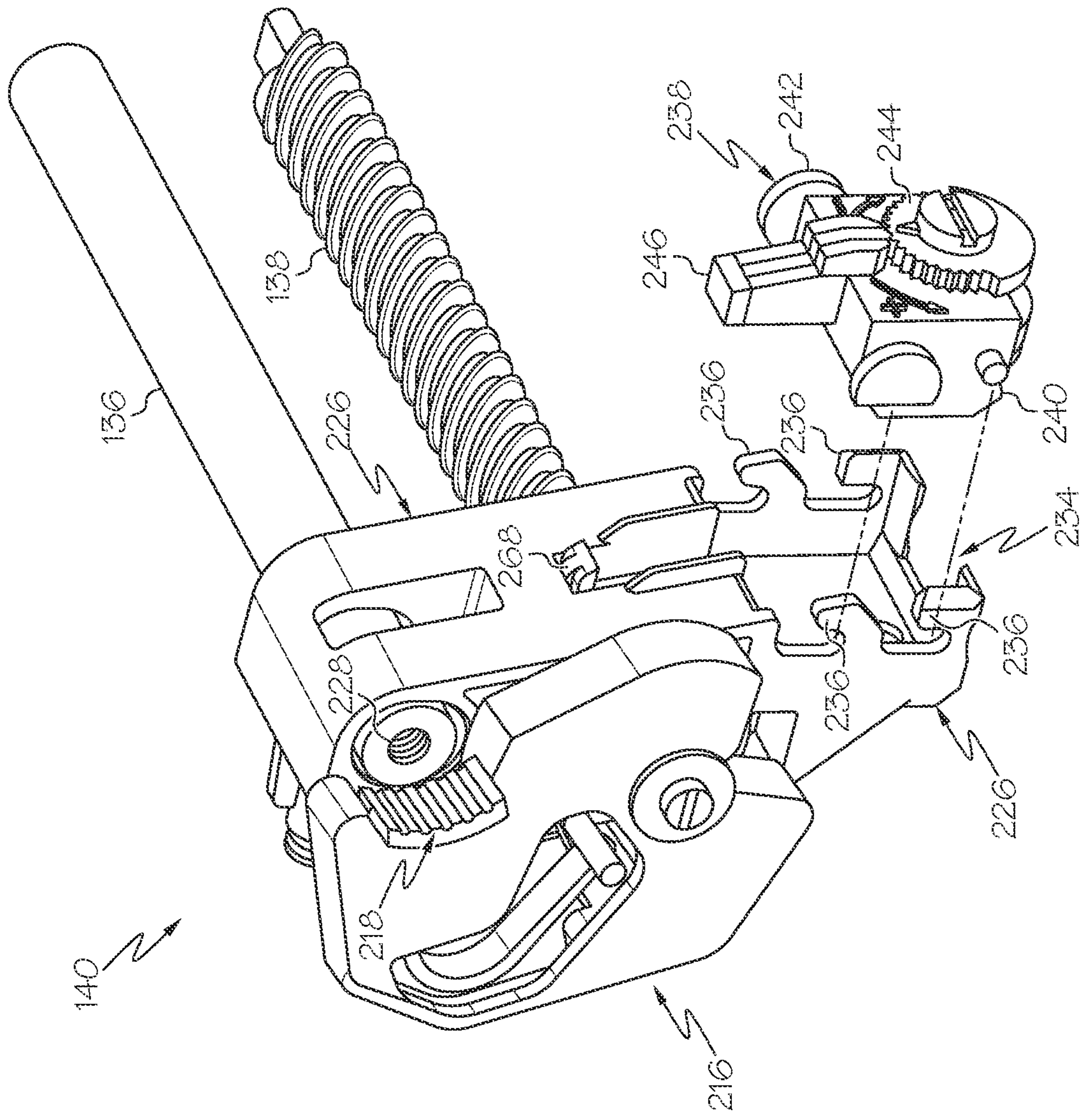
FIG. 5 illustrates a perspective front view of specific components of a cutter assembly, with the lateral walls removed and the cutter cartridge displaced from the cutter carrier, in accordance with some embodiments.

FIG. 5 illustrates a perspective front view of specific components of a cutter assembly 140, with the lateral walls 120 and 122 removed and the cutter cartridge 238 displaced from the cutter carrier 226, in accordance with some embodiments. Some embodiments may include one or more of a cartridge release tab 218, a cartridge release actuator 216, a pressure exerting portion 268, attachment points 236, a detent component 246, a cutter carrier 226, a cutter cartridge holder 234, a housing 240, a cutter cartridge 238, flanges 242, and a cut depth adjustment knob 244.

In various embodiments, cutter assembly 140 may include one or more of a cutter carrier 226 and a removable cutter cartridge 238, each of which are described more fully below. In some embodiments, the cutting unit 116 includes a cartridge release actuator 216 comprising a cartridge release tab 218 and an actuator tab (not shown). The cartridge release actuator 216 may be positioned on the "home" side of cutting unit 116 and outboard of cutter assembly 140, which may be located on the end of screw shaft 138. In some embodiments, a cartridge release actuator 216 allows an operator to release and remove cutter cartridge 238 as an entire unit from the cutter carrier 226 of cutter assembly 140 without the need for external tools. More specifically, in some embodiments, the cartridge release tab 218 is configured such that the operator actuates or presses the cartridge release tab 218 in a backward or counter-clockwise direction which, in turn, permits the cutter cartridge 238 to engage or disengage with the cutter assembly 140. For example, rotation of the cartridge release tab 218 may lift the pressure exerting portion 268, which in turn may release the detent component 246. Once released, the cutter cartridge 238 may be removed from the cutter cartridge holder 234. A user may grasp the flanges 242 to hold or otherwise manipulate the cutter cartridge 238. In this manner, cutter assembly 140 can easily be repaired or replaced with minimal effort, risk of injury and/or downtime.

In some embodiments, cutting unit 116 may include one or more sensors 222 (e.g., an optical sensor, a magnetic sensor, an electrical sensor) and optical interrupt blades or ribs (not shown) on the cutter carrier 226 to allow appropriate sensing for motor control at the end of a cutting process. In some embodiments, one or more sensors 222 are mounted to one or both of the first lateral wall 120 and the second lateral wall 122. The one or more sensors 222 may be used to set a zero position for the cutting unit 116, such as for the cutter assembly 140. In some embodiments, a second sensor can be used to set the cut stop location distal to a first sensor location. Alternatively, in some embodiments, motor rotation position feedback may be used to set a cut distance, such as based on a programmable input on the cutter's user interface.

In some embodiments, having sensors 222 on one or both lateral walls may help provide cutter jam detection for each corresponding direction of cut associated with a sensor 222. In some embodiments, if a cutter assembly 140 fails to reach a sensor, a cutter processor 434 (see FIG. 10) determines that a jam has occurred. One or both sensors 122 may be adjustable in position for setting a desired cutting zone based on label location and/or width. For example, one or both sensors 122 may be adjustable by a user with or without using tools for purposes of setting a desired cutting zone, which may be based on a label position and/or width. One or both sensors 122 may be adjustable in position to avoid blade wear from direct contact between a blade and an anvil of the cutting unit.

In some embodiments, the motor 129 may include position feedback such as from a rotary encoder mounted to the back of the motor (not shown) that can be used to sense the location of the cutter for improved jam detection, diagnostics, and/or closed loop control of the motor for improved cutter motion quality.

Figure 6:
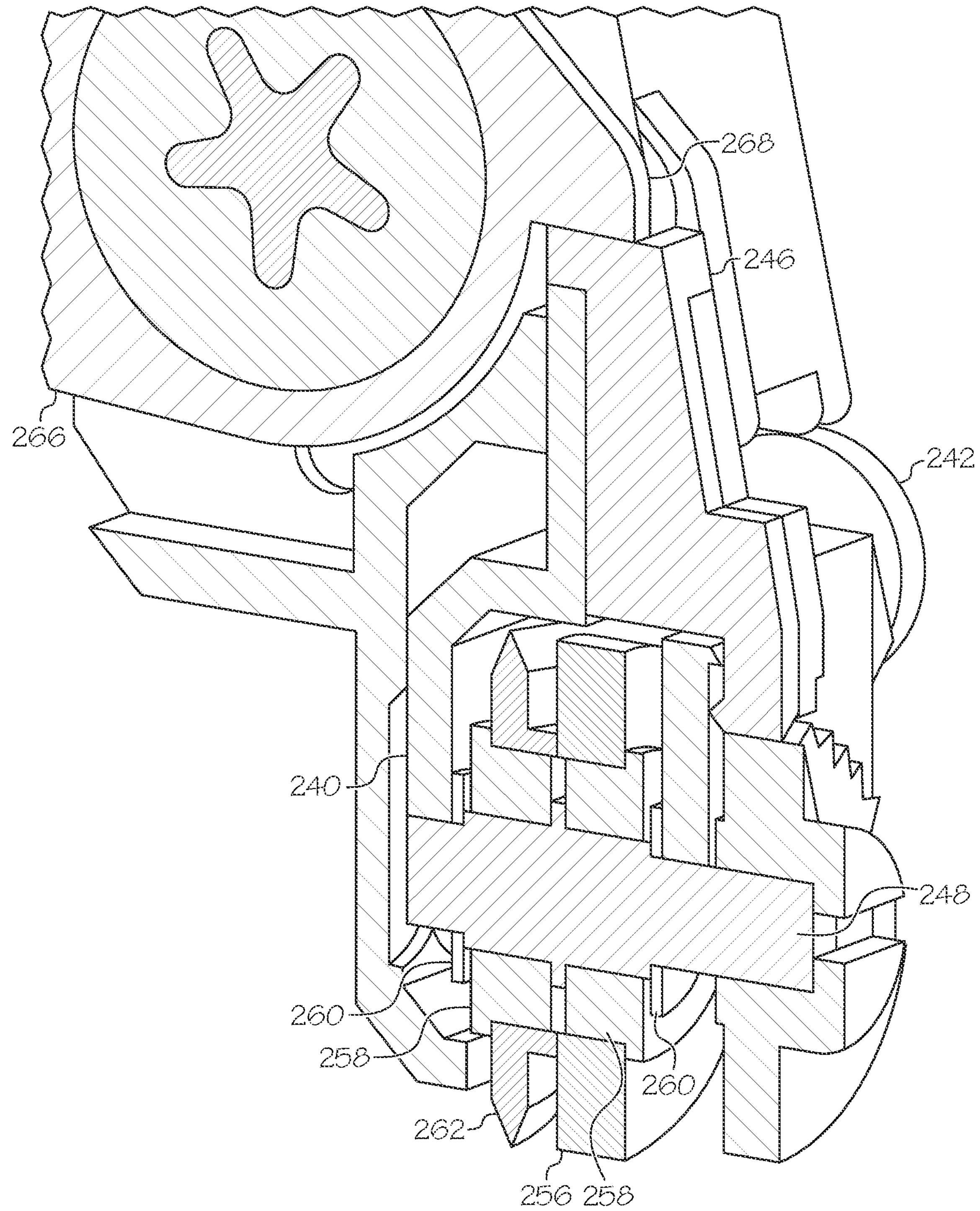
FIG. 6 illustrates an enlarged perspective cross-sectional view of the cutter assembly in accordance with some embodiments.

FIG. 6 illustrates an enlarged perspective cross-sectional view of the cutter assembly 140 in accordance with some embodiments. Various embodiments may include one or more of a pressure hub 266, a spacer 260, a cutting blade 262, a bearer roller 256, and an eccentric pinion shaft 248.

Figure 7:
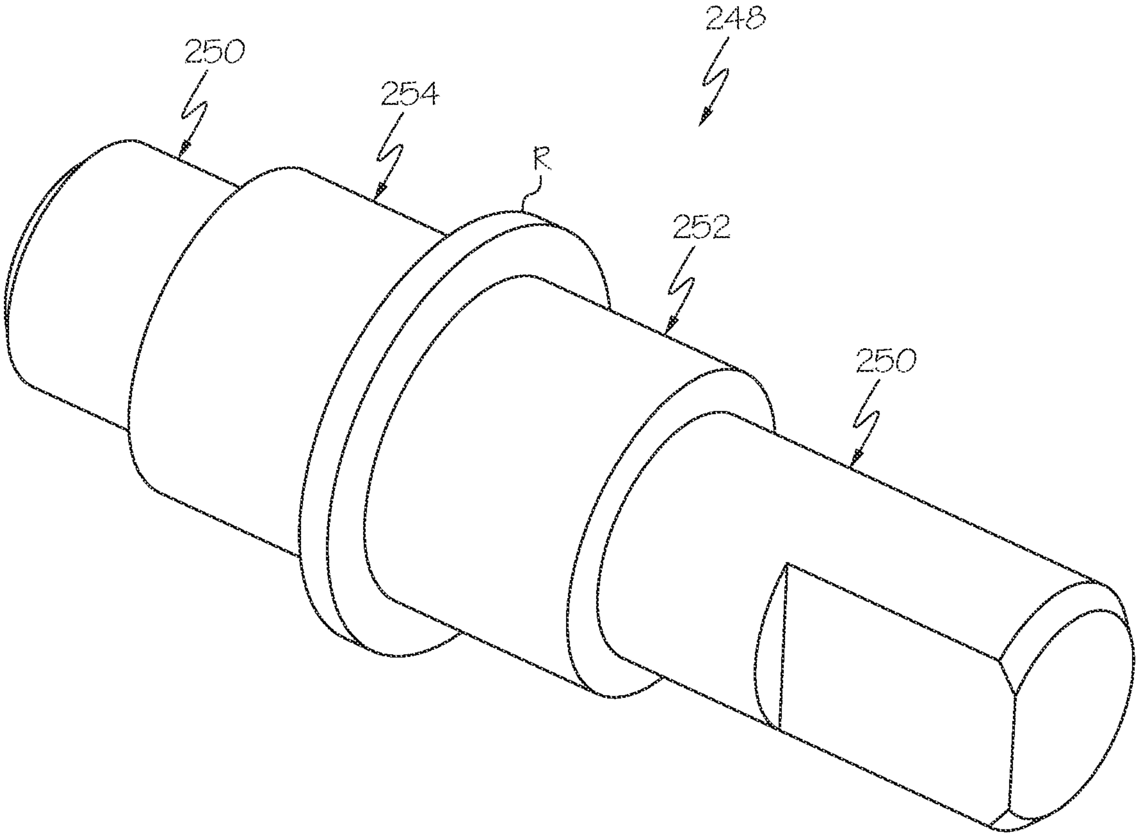
FIG. 7 illustrates a perspective view of the eccentric pinion shaft of the cutter cartridge in accordance with some embodiments.

FIG. 7 illustrates a perspective view of the eccentric pinion shaft of the cutter cartridge 238 in accordance with some embodiments. Various embodiments may include one or more of a housing support 250, a bearer roller support 252, and a cutter wheel support 254.

In various embodiments, rotation of the cut depth adjustment knob 244 causes rotation of the eccentric pinion shaft 248. During rotation, housing supports 250 may slide within corresponding parts of the housing 240. One or both of the cutter wheel support 254 and the bearer roller support 252 may be eccentrically disposed relative to the axis of the housing support 250. In some embodiments, the cutter wheel support 254 is eccentric or offset from the other sections of the eccentric pinion shaft 248. In some embodiments, the central axis of the bearer roller support 252 and the housing supports 250 are concentrically aligned.

Rotation of the eccentric pinion shaft 248 may thus cause displacement of one or more of components mounted and/or supported by the cutter wheel support 254 and the bearer roller support 252. Rotation of the cut depth adjustment knob 244 may thus effectively control how far the cutting blade 262 extends beyond the bearer roller 256. This in turn may allow control over to what depth the cutting blade 262 cuts into a given label, whether it cuts into a liner beneath, or whether it cuts partially or entirely through one, multiple, or all layers of the label web 106.

Figure 8:
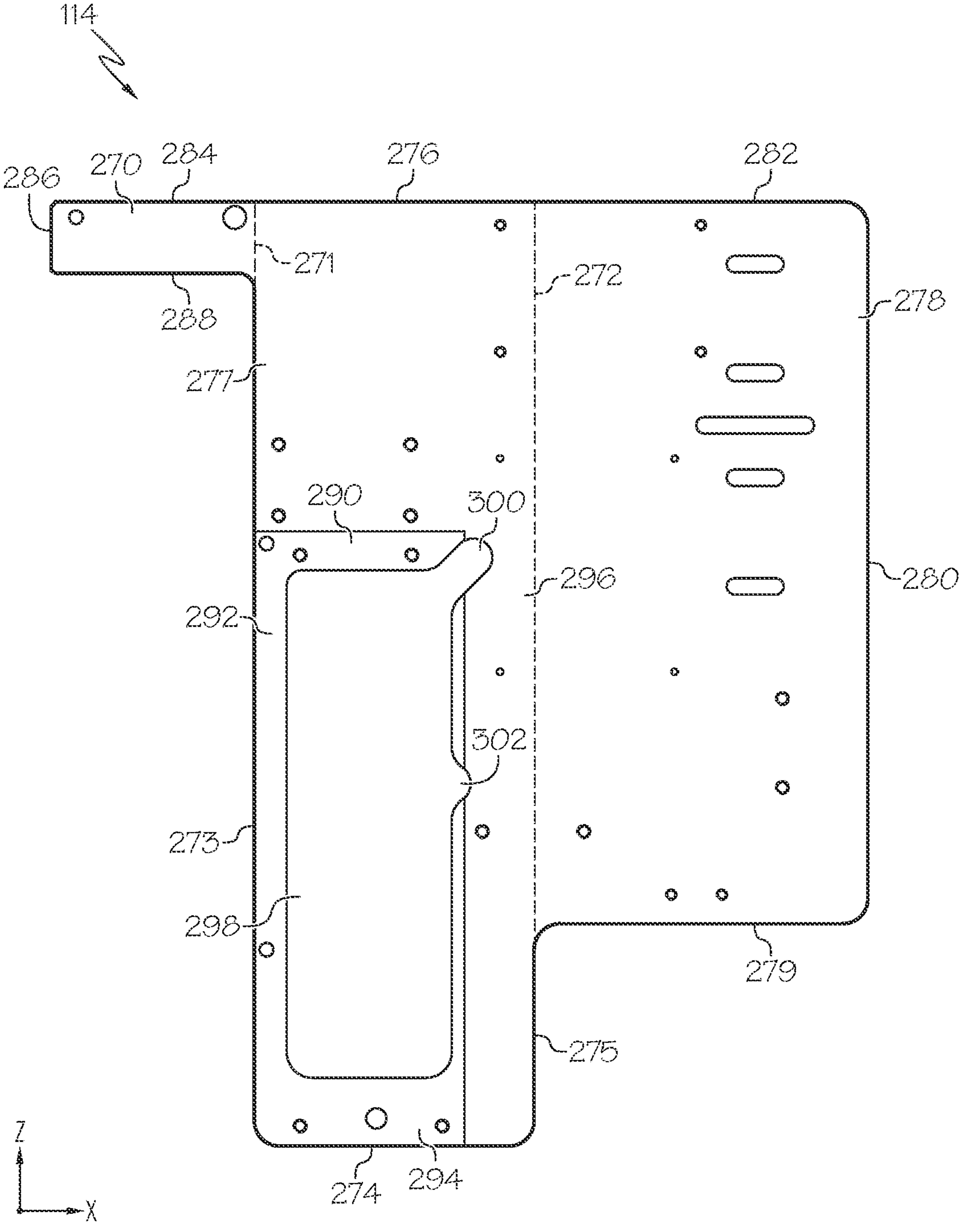
FIG. 8 is a plan view of a support bracket in accordance with some embodiments.

FIG. 8 is a plan view of a support bracket 114 in accordance with some embodiments. Some embodiments may include one or more of a cutter mount region 277, a tamp mount region 278, a bracket mount region 270, a first border 271, a second border 272, a first edge 273, a second edge 274, a third edge 275, a fourth edge 276, a first edge 278, a second edge 280, a third edge 282, a first edge 284, a second edge 286, a third edge 288, a first border 290, a second border 292, a third border 294, a fourth border 296, a cavity 298, a first indentation 300, and a second indentation 302.

In some embodiments, the bracket mount region 270 may extend from a side of the cutter mount region 277, and the tamp mount region 278 may extend from an opposite side of the cutter mount region 277. The bracket mount region 270 may include the first edge 284, the second edge 286, the third edge 288, and the first border 290. The first border 290 may be shared between the bracket mount region 270 and the cutter mount region. The bracket mount region 270 may be an elongated plate extending along an X-axis direction away from the cutter mount region. In some embodiments, the bracket mount region 270 may be short, wide, narrow, or have any other shape suitable for securing the support bracket 114 to a printer or other support.

In operation, the bracket mount region 270 may be secured to a printer needing additional capabilities with respect to cutting and/or tamping. Securing mechanisms may include one or more of using fasteners such as screws, bolts, or other connectors to welding. In some embodiments, the bracket mount region 270 may be integrally formed with another printer component.

In some embodiments, the cutter mount region 277 may include the first border 271, the second border 272, a first edge 273, a second edge 274, and a third edge 275. The bracket mount region 270 may extend from the first edge 273 of the cutter mount region 277 at the first border 271. The tamp mount region 278 may extend from the third edge 275 of the cutter mount region 277 at the second border 272.

In some embodiments, the cutter mount region 277 may be configured to support a cutting unit 116 that can be adapted to add greater functionality to a printer system. For example, adding the cutting unit 116 may enable the printer to cut variable length labels from a label web 106 with a continuous label layer that has not been precut into predefined lengths. In some embodiments, the cutter mount region 277 may enable an appropriately configured cutting unit 116 to modify an existing printer, whether or not that printer already has a cutting capability, to have a variable cut length capability.

In some embodiments, the cutter mount region 277 may define a cavity 298 configured to permit portions of the cutting unit 116 to extend through the support bracket 114. In some embodiments, the portions extending into and/or through the cavity may include one or more of the first wheel 130, the second wheel 134, and the belt 132. The cavity 298 may be defined by a first border 290, a second border 292, a third border 294, and a fourth border 296. In some embodiments, the second border 292 is an elongate member extending along the Z-axis, and the third border 294 extending along the X-axis.

The cutter mount region 277 may define a first indentation 300 that extends at an angle between the X and Z directions from the intersection of the first border 290 and the fourth border 296. In some embodiments, the angle may be between 20 and 70 degrees, 30 and 60 degrees, or 40 and 50 degrees away from the X-axis. The cutter mount region 277 may define a second indentation 302 formed in an edge of the fourth border 296. The second indentation 302 may open along the X-axis towards the cavity 298.

In some embodiments, the tamp mount region 278 may be shorter as measured along the Z-axis direction than the cutter mount region 277. The tamp mount region 278 may extend laterally from the second border 272 away from the cutter mount region 277 along the X-axis direction. In some embodiments, the tamp mount region 278 may include a first edge 279, a second edge 280, and a third edge 282.

Figure 9:
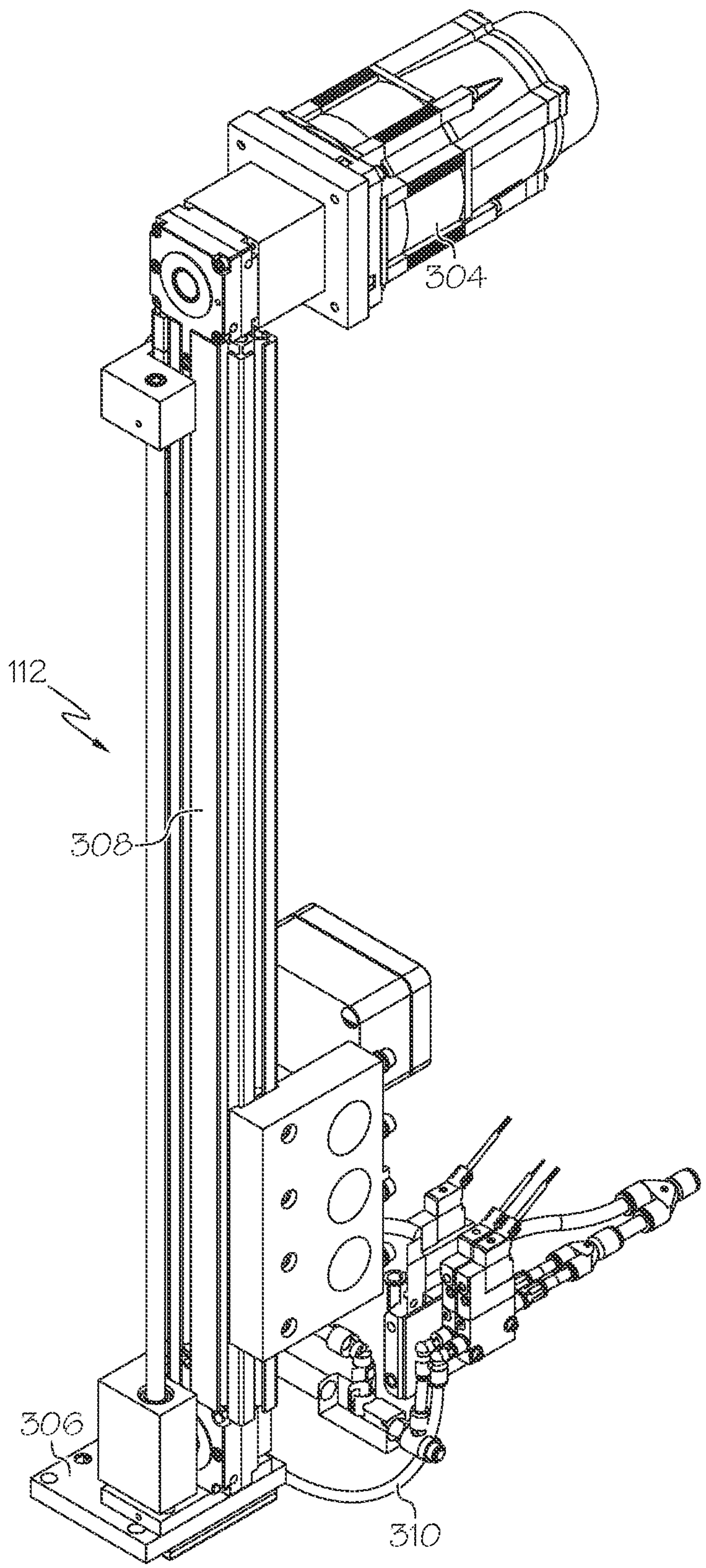
FIG. 9 is a perspective view of a tamp system in accordance with some embodiments.

FIG. 9 is a perspective view of a tamp system 112 in accordance with some embodiments. In some embodiments, the tamp system 112 includes a tamp driver 304, a tamp head 306, a beam 308, and at least one vacuum tube 310. The tamp driver 304 may be configured to drive movement of the tamp head 306 linearly, such as along a Z-axis, X-axis, or Y-axis direction. Moving the tamp head 306 in various directions may help with applying labels to the top, side, or an underside of an object such as a box or package. In some embodiments, the tamp driver 304 is an electric motor or an air cylinder. In various embodiments, at least one vacuum tube 310 may draw air into one or more holes disposed in the lowest side of the tamp head, creating a suction sufficient to hold a label against the tamp head until an adhesive side is adhered to a target object. The beam 308 may telescope to allow extension of the tamp head 306 to deliver a label to a target object, such as a package.

Figure 10:
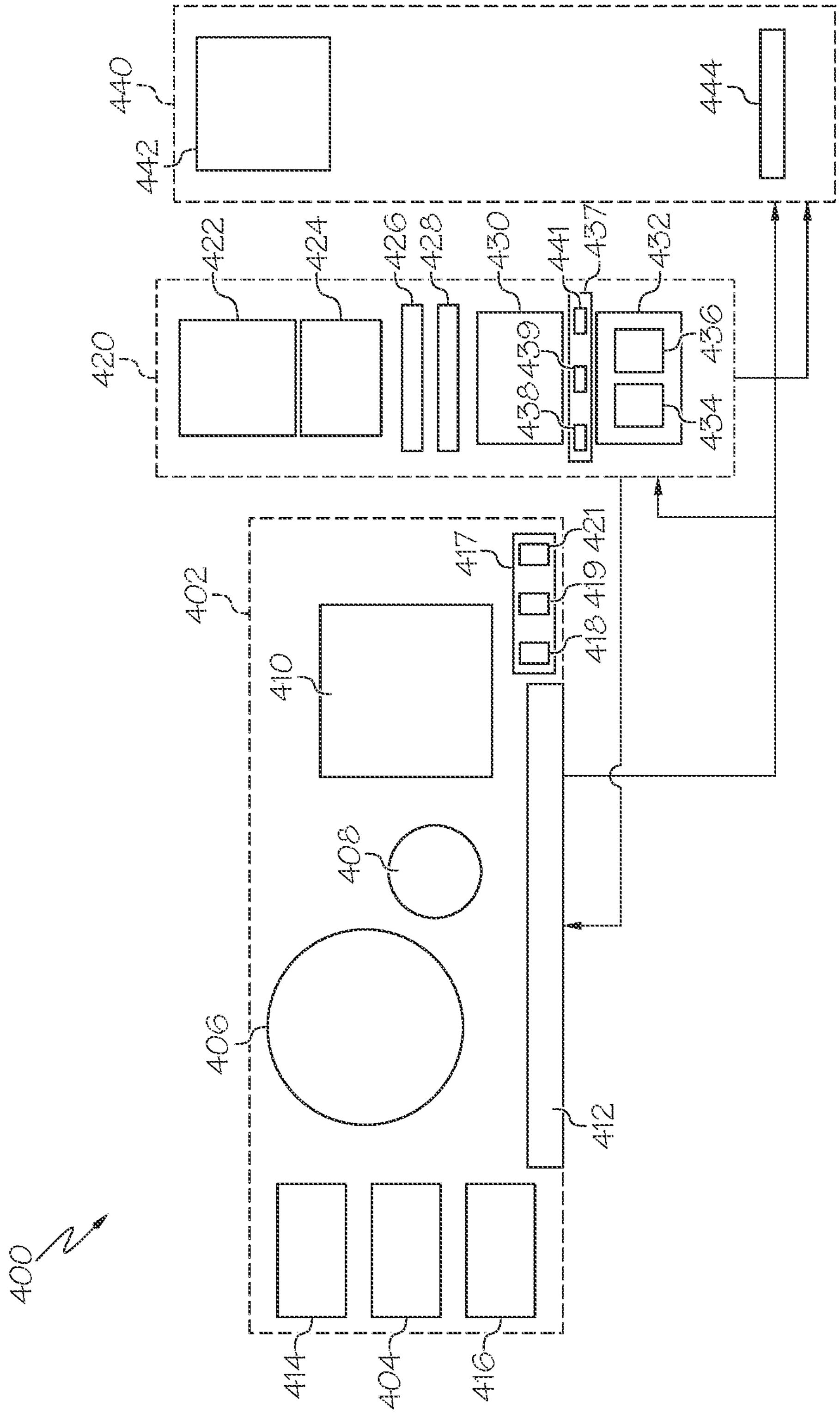
FIG. 10 is a block diagram of a printing system in accordance with some embodiments.

FIG. 10 is a block diagram of a printing system 400 in accordance with some embodiments. In various embodiments the printing system 400 may include one or more of a print and apply machine 402, a cutter system 420, and/or the label applicator 440. In various embodiments, the print and apply machine 402 may be the same or different from the printer system 101. In various embodiments, the cutter system 420 may be the same or different from the cutting unit 116. In various embodiments, the label applicator 440 may be the same or different from the tamp system 112.

In some embodiments, the print and apply machine 402 may include one or more of a power supply 404, a supply roll 406, a liner takeup 408, a printer 410, an applicator interface 412, a printer processor 414, a printer memory 416, a printer user interface 417, a printer display 418, printer keys 419, and/or at least one printer indicator light 421. In some embodiments, the cutter system 420 may include one or more of a cutter mechanism 422, a cutter motor 424, a left home sensor 426, a right home sensor 428, a power supply 430, a cutter control board 432, a cutter processor 434, cutter memory 436, a cutter user interface 437, a cutter display 438, cutter keys 439, and/or at least one cutter indicator light 441. In some embodiments, the label applicator 440 may include one or more of a tamp mechanism 442 and/or an airstream control 444.

In some embodiments, the printer user interface 417 may provide information about the print and apply machine 402 to a user, such as regarding programmable inputs and machine status reporting. In some embodiments, the printer display 418 may be used to provide text and/or images, and the printer keys 419 may be physical keys or touch screen buttons. In some embodiments, the printer indicator light 421 may be used to provide information regarding the status of the print and apply machine 402.

In some embodiments, the cutter user interface 437 may provide information about the cutter system 420 to a user, such as regarding programmable inputs and machine status reporting. In some embodiments, the cutter display 438 may be used to provide text and/or images, and the cutter keys 439 may be physical keys or touch screen buttons. In some embodiments, the cutter indicator light 441 may be used to provide information regarding status of the cutter system 420.

In some embodiments, the power supply 404 provides power to the print and apply machine 402. The supply roll 406 provides a label web 106 that is received by the printer 410. The liner 107 for the label web 106 may be drawn back onto the liner takeup 408. The cutter system 420 may then receive the label web 106. The printer processor 414 and the printer memory 416 may be configured through software instructions to control operations of the print and apply machine 402 and to communicate with other devices and systems.

In some embodiments, the cutter mechanism 422 is moved laterally by the cutter motor 424. The left home sensor 426 and the right home sensor 428 provide signals when the cutter mechanism 422 reaches a left home or a right home position, respectively. In various embodiments, the power supply 404 and/or the power supply 430 provides power to the cutter system 420. The cutter control board 432 includes at least one cutter processor 434 and at least one cutter memory 436 which contain software instructions that control operation of the cutter system 420 and/or communication with other systems.

In some embodiments, the cutter system 420 and the label applicator 440 receive the same signals from the print and apply machine 402, and the cutter system 420 adapts its cutting operations based on the instructions provided to the tamp mechanism 442, such as for control of an airstream and/or triggering a tamping sequence. In some embodiments, for some modular add-on systems for printers lacking a cutting system, this or other outputs from the print and apply system 402 may be used to control one or more functions of the cutter system 420. The label applicator 440 may receive the same control signals from the print and apply system 402.

In some embodiments, the cutter processor 434 detects the termination of an airstream signal 448 from the printer processor 414 to the tamp mechanism 442. In some embodiments, the airstream signal 448 is used to turn on an air assist valve that directs air towards an extended label that is cantilevered out from a support such that the extended label end is pushed towards the tamp head (e.g., the tamp head 306). The tamp head may have a vacuum assist that draws the label and/or label end towards the tamp head. In various embodiments, the tamp head vacuum and the air assist are both used at the same time, and may be started and/or stopped at the same time.

Based on the termination of the airstream signal 448, the cutter processor 434 may cause the cutter motor 424 to drive the cutter mechanism 422 until one of the left home sensor 426 and the right home sensor 428 detects that the cutter mechanism 422 has reached a left or right end point, at which point the cutter processor 434 may 1) cause the cutter motor 424 to stop and/or 2) may send an instruction to cause the print and apply machine 402 to perform a feed bump (e.g., advancing the label web 106 a limited distance). In some embodiments, the feed bump may be less than 2 mm, 4 mm, 6 mm, 8 mm, 10 mm, 15 mm, 20 mm, 25 mm, 30 mm, 50 mm, 75 mm, 100 mm, or 150 mm. In some embodiments, the feed bump advances a cut edge of a label forward off of the cutter's anvil by an adjustable distance, as described above. The feed bump may improve the likelihood that the label's cut edge has been properly separated from the previous label on the liner before being tamped.

After the feed bump, the label web 106 may have been sufficiently advanced and/or the liner web 107 retracted to permit the tamp mechanism 442 to pick up a cut label on the tamp head 306 using a vacuum drawing air in through holes on the tamp head 306. The tamp driver 304 may then drive movement of the tamp head 306, extending it down and toward a target object (e.g. a package). The tamp head 306 may be used to press a label down against the target object, where the adhesion layer may become adhered to the target object, bonding the label to the target object. The tamp driver 304 may then retract the tamp head 306 to a retracted position where it may be positioned to accept another label once cut.

The print and apply machine 402 can then retract the label web 106 back into the print and apply machine 402 to get it ready for printing a subsequent label without wasting label material.

Figure 11:
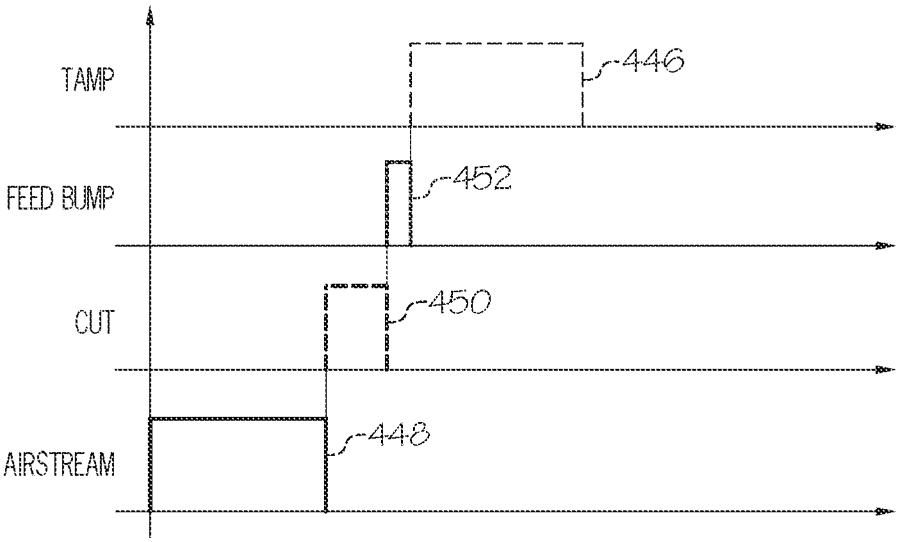
FIG. 11 is an illustration of signal sequences for operation of a printer system in accordance with some embodiments.

FIG. 11 is an illustration of signal sequences for operation of a printer system 400 in accordance with some embodiments. As shown, the sequence may include one or more of a tamp operation 446, an airstream signal 448, a cut operation 450, and a feed bump operation 452.

The airstream signal 448 may be provided by the print and apply machine 402 to be received by the cutter system 420 and the label applicator 440 as a signal input. While the airstream signal 448 is high and/or asserted, the label applicator 440 will cause the vacuum for the tamp head to be turned on. For example, in some embodiments, while the airstream signal 448 is asserted, the label applicator 440 will assert the vacuum signal for the vacuum system of the tamp mechanism 442 tamp head 306 to turn on.

Once the airstream signal 448 has ended or returned to a lowered state, the cutter processor 434 may initiate a cut operation 450 causing the cutter motor 424 to drive the cutter mechanism 422 laterally across the label web 406. For example, the cut operation 450 may be triggered by the falling edge of the airstream signal 448. In some embodiments, the cut operation 450 is driven by a corresponding cut signal. Once the cutter mechanism 422 has reached an end position based on signals from either the left home sensor 426 or the right home sensor 428, the cutter processor 434 may be configured to terminate the cut operation 450. For example, in some embodiments, the cutter processor 434 may be part of a microcontroller that is configured to control a stepper motor circuit for the cutter motor 424. Analog circuitry may be used to monitor the left home 426 and/or right home sensors 428 and/or to communicate with the cutter processor 434.

Once the cut operation 450 has been terminated, the printer processor 414 may initiate a feed bump operation 452, which may be initiated in response to a signal, signal change, or signal termination from the cutter processor 434, based on a timer (e.g., a time delay), or based on other inputs to the printer processor 414 and/or determinations made by the printer processor 114. For example, in some embodiments, the feed bump may be asserted by the printer processor 414 after sensing that the cut signal from the cutter system 420 has ended, such as 1) by measuring a programmable time delay from the falling edge of the air stream signal 448 or 2) based on a signal from the cutter system 420 indicating that cutting is complete.

In some embodiments, a start signal pulse is generated when a package or product has reached a predetermined location or position. For example, a package or product may be detected by a camera or a photo sensor, RFID sensor, light curtain, or other sensor as it is transported on a conveyor belt, feed system, slide, rollers, or other movement mechanism. The start signal pulse may also trigger an associated start delay, which may be a timer that is triggered once the start signal pulse is initiated.

Once sufficient conditions have been satisfied, the printer processor 414 and/or the cutter processor 434 may initiate a tamp operation 446, which may include causing the label applicator 440 to begin a tamp operation 446 or series of operations associated with the tamp operation 446.

In some embodiments, a tamp operation 446 is prevented from occurring until all of the following conditions are met: 1) the airstream signal 448 has ended or returned to a lowered state; 2) the start pulse (not shown) has occurred; 3) the start delay has elapsed; 4) the cut operation has 450 has terminated; 5) the feed bump operation 452 has been completed. In some embodiments, a tamp operation 446 is allowed to occur or prevented from occurring based on whether one or more of the conditions listed above have been satisfied.

In some embodiments, if a cutter error or jam occurs, a block/error signal 454 (not shown) may be issued by the cutter system 420 to be received by the print and apply machine 402. When received by the print and apply machine 402, the block/error signal 454 may cause the print and apply machine 402 to be restricted from performing the tamp operation 446.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. A modular system for attachment to a printer having a printer processor, the system comprising:
- a support bracket comprising a cutter mount region, a tamp mount region, and a bracket mount region configured to secure the support bracket to a printer;
- a cutting unit laterally mounted to the support bracket and supported by the cutter mount region, the cutting unit comprising a cutter processor configured to control a cutting operation based on an airstream signal from the printer processor; and
- a tamp system laterally mounted to the support bracket and supported by the tamp mount region,
- wherein the cutting unit is configured to receive a label web from the printer and to cut the label web.

2. The system of claim 1, wherein the cutting unit is configured to cut the label web based on control signals exchanged with the printer and at least one adjustable time delay.

3. The system of claim 1, wherein the cutting unit further comprises a motor and a first lateral wall, the motor being mounted to the first lateral wall.

4. The system of claim 3, wherein the cutting unit further comprises a second lateral wall, a first support, and a second support,
- wherein the first support and the second support each extend between and are mounted to the first lateral wall and the second lateral wall, the motor being mounted to the first lateral wall between the first support and the second support.

5. The system of claim 1, wherein the cutting unit further comprises a first web guide and a second web guide.

6. The system of claim 1, wherein the cutting unit comprises a moveable cutter assembly.

7. The system of claim 1, wherein the support bracket defines a cavity configured to receive a first wheel, a belt, and a second wheel of the cutter unit.

8. The system of claim 1, wherein the cutting unit comprises a first wheel and a second wheel that are vertically aligned.

9. The system of claim 1, wherein the cutting unit comprises at least one sensor positioned for initialization of the cutting unit.

10. The system of claim 1, wherein the cutting unit comprises at least one sensor that is moveable to avoid blade wear from direct contact between a blade and an anvil of the cutting unit.

11. The system of claim 1, wherein the system is configured to prevent a tamp operation from occurring until after at least one of a cut operation and a feed bump operation have been completed.

12. The system of claim 1, wherein the system is configured to perform a feed bump operation after the system has performed a cut operation.

13. A method of forming a modular system for attachment to a printer having a printer processor, the method comprising:
- forming a support bracket comprising a cutter mount region, a tamp mount region, and a bracket mount region configured to secure the support bracket to a printer;
- laterally mounting a cutting unit to the support bracket and supporting the cutting unit by the cutter mount region, the cutting unit comprising a cutter processor configured to control a cutting operation based on an airstream signal from the printer processor; and
- laterally mounting a tamp system to the support bracket and supporting the tamp system by the tamp mount region,
- wherein the cutting unit is configured to receive a label web from the printer and to cut the label web.

14. The method of claim 13, wherein the cutting unit is configured to cut the label web based on control signals exchanged with the printer and at least one adjustable time delay.

15. The method of claim 13, further comprising mounting a motor to a first lateral wall of the cutting unit.

16. The method of claim 15, further comprising:
- forming the cutting unit by assembling a second lateral wall, a first support, and a second support such that the first support and the second support each extend between and are mounted to the first lateral wall and the second lateral wall, and the motor is mounted to the first lateral wall between the first support and the second support.

17. The method of claim 13, wherein the cutting unit further comprises a first web guide and a second web guide.

18. The method of claim 13, wherein the cutting unit comprises a moveable cutter assembly.

19. The method of claim 13, wherein the support bracket defines a cavity configured to receive a first wheel, a belt, and a second wheel of the cutter unit.

20. The method of claim 13, wherein the cutting unit comprises a first wheel and a second wheel that are vertically aligned.

21. The method of claim 13, wherein the cutting unit comprises at least one sensor positioned for initialization of the cutting unit.

22. The method of claim 13, wherein the cutting unit comprises at least one sensor that is moveable to avoid blade wear from direct contact between a blade and an anvil of the cutting unit.

* * * * *